(12) United States Patent
Crowe et al.

(10) Patent No.: US 8,058,982 B2
(45) Date of Patent: Nov. 15, 2011

(54) INFORMATION DISPLAY SYSTEMS AND METHODS FOR HYBRID VEHICLES

(75) Inventors: Paul S. Crowe, Aubrey, TX (US); Myra Ma, Kirkland, WA (US); Shawn Brewer, Denton, TX (US); John W. Espinosa, Highlands Ranch, CO (US); Tak Lee, Northridge, CA (US); Derek S. Sancer, Denton, TX (US)

(73) Assignee: PACCAR Inc, Bellevue, WA (US)

( * ) Notice: Subject to any disclaimer, the term of this patent is extended or adjusted under 35 U.S.C. 154(b) by 325 days.

(21) Appl. No.: 12/202,162

(22) Filed: Aug. 29, 2008

(65) Prior Publication Data

US 2010/0052888 A1    Mar. 4, 2010

(51) Int. Cl.
*B60Q 1/00*     (2006.01)
*G09F 9/00*     (2006.01)
*G05D 3/00*     (2006.01)
*G06F 7/00*     (2006.01)
*G06G 7/70*     (2006.01)

(52) U.S. Cl. ......... 340/455; 340/461; 340/439; 701/22; 701/99

(58) Field of Classification Search .......... 340/459–461, 340/438–444, 455–456
See application file for complete search history.

(56) References Cited

U.S. PATENT DOCUMENTS

| | | | |
|---|---|---|---|
| 5,521,824 A * | 5/1996 | Eagan et al. | 701/101 |
| 5,748,301 A * | 5/1998 | Muller et al. | 356/155 |
| 7,145,442 B1 | 12/2006 | Wai | |
| 2001/0002450 A1* | 5/2001 | Mizutani et al. | 701/33 |
| 2004/0216636 A1 | 11/2004 | Emori | |
| 2005/0128065 A1 | 6/2005 | Kolpasky | |
| 2007/0208468 A1 | 9/2007 | Sankaran | |

FOREIGN PATENT DOCUMENTS

| | | |
|---|---|---|
| JP | 2000247164 A | 9/2000 |
| JP | 2002247706 A | 8/2002 |
| JP | 2007050889 A | 3/2007 |
| WO | 2006/001809 A1 | 1/2006 |

OTHER PUBLICATIONS

European Search Report mailed Nov. 9, 2009, in corresponding European Patent Application No. 09 16 9063.

* cited by examiner

*Primary Examiner* — Benjamin C Lee
*Assistant Examiner* — Michael T Shannon
(74) *Attorney, Agent, or Firm* — Christensen O'Connor Johnson Kindness PLLC (57) ABSTRACT

Information display systems capable of iconically representing the components of a hybrid powertrain and method thereof. In operation, the information display systems indicate the specific powertrain components in the hybrid system that are active in various hybrid operational modes (e.g., electric launch, blended torque, etc.). In particular, active components are highlighted (i.e., increased intensity) by the display and non-active components are faded (i.e., decreased intensity). In one embodiment, the vehicle wheels are depicted with a static intensity in-between that of the active components and the non-active components. This allows the vehicle operator to clearly see which components are active during each hybrid system mode, and to gain a simplified picture of hybrid system behavior during normal operation at a glance.

9 Claims, 7 Drawing Sheets

INFORMATION DISPLAY SYSTEMS AND METHODS FOR HYBRID VEHICLES

BACKGROUND

Conventional vehicles, such as those powered by a single internal combustion engine, often provide a vehicle operator with information through a number of commonly used displays. For example, speedometers, odometers, tachometers, fuel level gauges, oil level indicators and engine temperature gauges are commonly used to provide information in analog and/or digital form. With the increase in prevalence of non-conventional vehicles, e.g., fuel cell vehicles and hybrid electric vehicles (HEV), a need has arisen to provide a vehicle operator with additional information unique to these non-conventional vehicles.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present invention are generally directed to information systems and methods for displaying hybrid vehicle information to the vehicle operator. In accordance with aspects of the present invention, an information display system for a hybrid vehicle is provided. The system includes at least one signal producing device generating data, a controlling component in communication with the signal producing device to transform the data into one or more display signals, and a display device disposed in communication with the controlling component for receiving the display signals and displaying the signals as a viewable image. The viewable image may include an energy storage device icon, an engine icon, a motor, and vehicle wheel icons, wherein at least one of the energy storage device icon, the engine icon, and motor icon is displayed with a lower intensity than the vehicle wheel icon, and wherein at least one of the energy storage device icon, the engine icon, and motor icon is displayed with a higher intensity than the vehicle wheel icon.

In accordance with another aspect of the present invention, a method of displaying the current operational mode of the vehicle is employed in a vehicle having vehicle components that include a first prime mover, such as an engine, a second prime mover, such as an electric motor, an energy storage device, vehicle drive wheels, a controller, and a graphical display capable of displaying iconic representations thereof. The method of displaying the current operational mode of the vehicle comprises the steps of: obtaining a set of vehicle operational data at the controller that represents the current operational condition of the vehicle components; processing the data at the controller; generating signals representative of the operational condition of the vehicle components; and displaying the generated signals on the graphical display as a viewable image. The viewable image comprises vehicle wheel icons having a first intensity, an energy storage device icon having an intensity higher or lower than the first intensity of the vehicle wheel icons, an engine icon having an intensity higher or lower than the first intensity of the vehicle wheel icons, and a motor icon having an intensity higher or lower than the first intensity of the vehicle wheel icons.

In accordance with yet another aspect of the present invention, a method of displaying the current operational mode of the vehicle is employed in a vehicle having vehicle components that include an engine, an electric motor, an energy storage device, vehicle drive wheels, a controller, and a graphical display capable of displaying iconic representations thereof. The method of displaying the current operational mode of the vehicle comprises the steps of: displaying at least one of the vehicle components in iconic format at a first intensity; displaying at least one of the vehicle components in iconic format at a higher intensity than the first intensity; and displaying at least one of the vehicle components in iconic format at a lower intensity than the first intensity.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Embodiments of the present invention will now be described with reference to the drawings where like numerals correspond to like elements. Embodiments of the present invention are generally directed to information display systems and methods suitable for use in vehicles, such as Class 8 trucks. More particularly, embodiments of the present invention are directed to information display systems, which can be suitable for use with vehicles of the hybrid type (e.g., gas-electric, diesel-electric, gas-hydraulic, diesel-hydraulic, etc.).

As will be described in more detail below, embodiments of the information display systems are capable of iconically representing the components of a hybrid powertrain. In operation, the information display systems indicate the specific powertrain components in the hybrid system that are active in various hybrid operational modes (e.g., electric launch, blended torque, etc.). In particular, active components are highlighted (i.e., increased intensity) by the display and non-active components are faded (i.e., decreased intensity). In one embodiment, the vehicle wheels are depicted with a static intensity in-between that of the active components and the non-active components. This allows the vehicle operator to clearly see which components are active during each hybrid system mode, and to gain a simplified picture of hybrid system behavior during normal operation at a glance.

As will be described in more detail below, embodiments of the information display systems may also display present information that allows the driver to increase fuel efficiency. More specifically, information is presented that allows the driver to maximize the time that the hybrid vehicle is able to operate in electric launch mode. To this end, the graphical display provides visual indicators and easily understood graphical representations that display the actual fuel efficiency currently being achieved in comparison to the driver's application of the throttle. As a result, the driver may be able to modify driving habits in order to keep the hybrid vehicle in electric launch mode for as long as possible.

Although exemplary embodiments of the present invention will be described hereinafter with reference to a hybrid powered heavy duty truck, it will be appreciated that aspects of the present invention have wide application, and therefore, may be suitable for use with many other types of vehicles, including but not limited to light & medium duty vehicles, passenger vehicles, motor homes, buses, commercial vehicles, marine vessels, et, that are hybrid powered. Accordingly, the following descriptions and illustrations herein should be considered illustrative in nature, and thus, not limiting the scope of the present invention, as claimed.

Prior to discussing the details of various aspects of the present invention, it should be understood that the following description includes sections that are presented largely in terms of logic and operations that may be performed by conventional electronic components. These electronic components, which may be grouped in a single location or distributed over a wide area, can generally include processors, memory, storage devices, input/output circuitry, etc. It will be appreciated by one skilled in the art that the logic described herein may be implemented in a variety of configurations, including but not limited to, analog circuitry, digital circuitry, processing units, etc., and combinations thereof. In circumstances were the components are distributed, the components are accessible to each other via communication links.

In the following description, numerous specific details are set forth in order to provide a thorough understanding of exemplary embodiments of the present invention. It will be apparent to one skilled in the art, however, that many embodiments of the present invention may be practiced without some or all of the specific details. In some instances, well-known process steps have not been described in detail in order not to unnecessarily obscure various aspects of the present invention.

Figure 2:
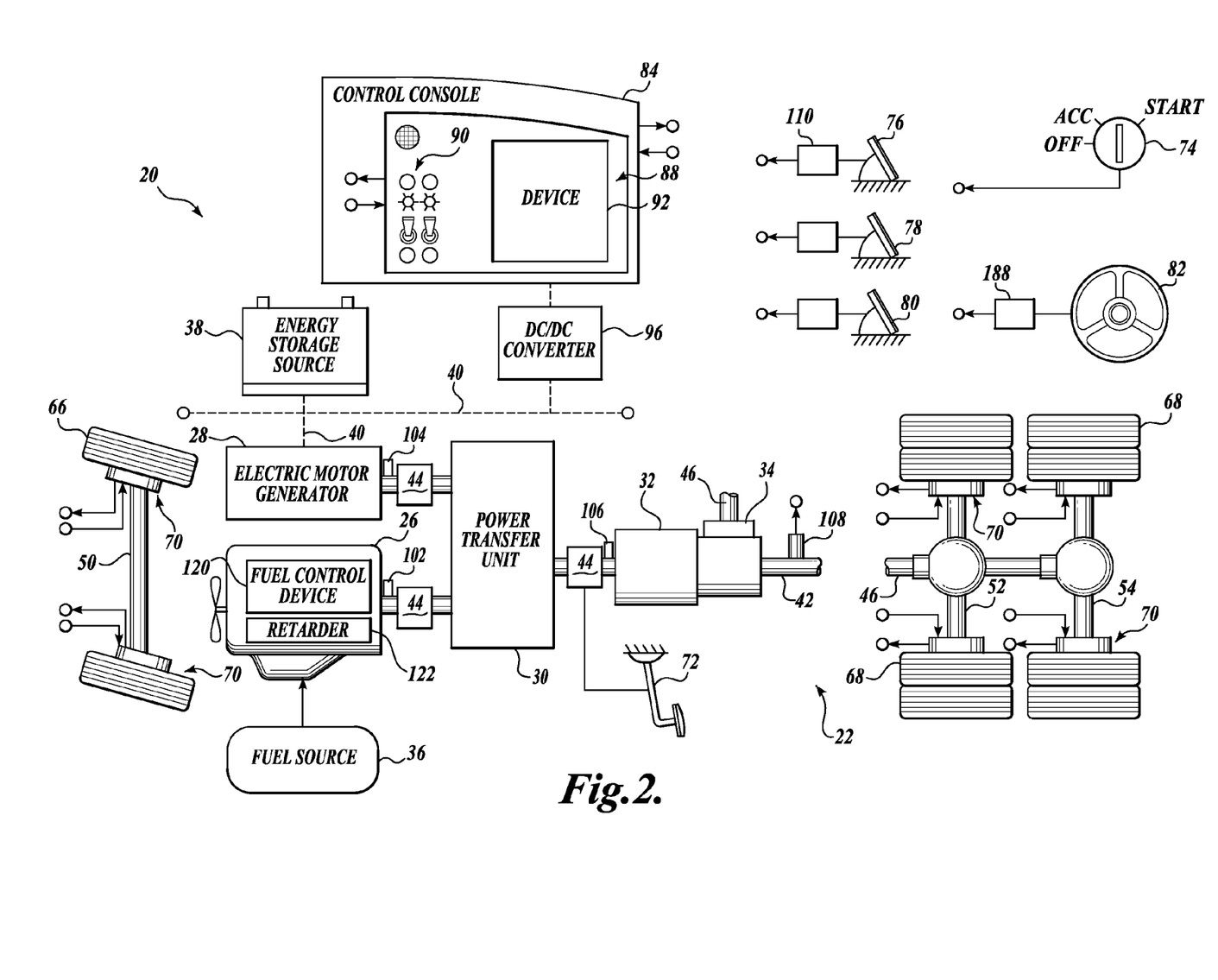
FIG. 2 is a schematic diagram of one suitable vehicle in which the information display system of FIG. 1 may be employed.

As briefly described above, embodiments of the present invention are directed to information display systems and methods suitable for use in a vehicle. One suitable vehicle in which the information display systems may be employed will now be described in more detail with reference to FIG. 2. Turning now to FIG. 2, there is shown a vehicle 20, such as a Class 8 tractor, having one suitable embodiment of a parallel hybrid powertrain 22. The vehicle 20 depicted in FIG. 2 represents one of the possible applications for the systems and methods of the present invention. It should be appreciated that aspects of the present invention transcend any particular type of land or marine vehicle employing a hybrid powertrain. Moreover, the hybrid powertrain 22 depicted in FIG. 2 has a parallel configuration, although hybrid powertrains with series configurations, or combined hybrid configurations (i.e., hybrids that operate in some manner as a parallel hybrid and a series hybrid) may also be employed.

One of ordinary skill in the art will appreciate that the hybrid powertrain 22 and associated subsystems/components may include many more components than those depicted in FIG. 2. For the sake of brevity, these additional components have not be described herein. However, it is not necessary that all of these generally conventional components be shown or described in order to disclose an illustrative embodiment for practicing the present invention, as claimed.

In the embodiment shown in FIG. 2, the hybrid powertrain 22 includes an internal combustion engine 26, an electric motor/generator 28, a power transfer unit 30, and a transmission 32. The hybrid powertrain 22 also includes a fuel source 36 or the like that stores any suitable combustive fuel, such as gasoline, diesel, natural gas, alcohol, etc. In use, the internal combustion engine 26 receives fuel from the fuel source 36 and converts the energy of the fuel into output torque. The powertrain 22 further comprises an energy storage device 38, which in several embodiments may be in the form of a high voltage battery, a bank of batteries or a capacitor. Alternatively, a device such as a fuel cell may be used in conjunction with a battery and/or capacitor to provide a source of electrical power for the powertrain 22. In use, the electric motor generator 28 can receive electrical energy from the energy storage device 38 via a high voltage DC bus 40 and converts the electrical energy into output torque. The electric motor generator 38 can also operate as a generator for generating electrical energy to be stored in the energy storage device 38.

Still referring to FIG. 2, the power transfer unit 30 operatively interconnects the internal combustion engine 26, the electric motor generator 28, and the transmission 32. The transmission 32 may be a manual transmission, an automated manual transmission, or an automatic transmission that includes multiple forward gears and a reverse gear operatively connected to an output shaft 42. The power transfer unit 30 is configured for selectively switching between multiple vehicle operating states or "modes," which include but are not limited to: 1) a state where only the output torque of the engine 26 is transmitted through the transmission 32 to the output shaft 42; 2) a state where only the output torque generated by the electric motor 28 is transferred through the transmission 32 to the output shaft 42; 3) a state where the output torque of the internal combustion engine 26 and the electric motor generator 28 is combined and transferred through the transmission 32 to the output shaft 42; 4) a state where the internal combustion engine 26 transmits output torque to the output shaft 42 through the transmission 32 and transmits output torque to the electric motor generator 28 so that the electric motor generator 28 acts as a generator for generating electrical energy to charge the energy storage device 38; and 5) a regenerative braking state where the internal combustion engine 26 is decoupled from the power transfer unit 30, and the input torque generated by the rear wheels is transmitted through the transmission 32 to the power transfer unit 30, which transmits this input torque to the electric motor generator 28 so that the electric motor generator 28 acts as a generator for generating electrical energy to charge the energy storage device 38.

In the embodiment of FIG. 2, a power take off (PTO) device 34 is provided that is operatively coupled to the transmission 32. The PTO device 34 is configured and arranged to work in conjunction with the transmission 32 to drive an auxiliary output shaft 46, as known in the art. In one embodiment, the auxiliary output shaft 46 is coupled to a hydraulic pump (not shown) or the like to provide power to a hydraulic system.

One or more clutch assemblies 44 may be positioned between the internal combustion engine 26 and electric motor generator 28 and the power transfer unit 30 and/or the transmission 32 to selectively engage/disengage the internal combustion engine 26 and electric motor generator 28 from the power transfer unit 30 and/or the transmission 32. The one or more clutch assemblies 44 may be part of the power transfer unit 30 or may be discrete therefrom. In one embodiment, the power transfer unit 30 may include a planetary gear set conventionally arranged for carrying out the functions 1-5 described above. Of course, other types of power transfer units, including other gear sets and transmissions, may be employed. In another embodiment, the power transfer unit 30 and the transmission 32 may be arranged as a unitary device that provides both the functions of the power transfer unit 30 and that of the transmission 32. One type of unitary device that may be employed by the powertrain 22 is known in the art as a power split device.

The vehicle 20 also includes at least two axles such as a steer axle 50 and at least one drive axle, such as axles 52 and 54. The output shaft 42 of the transmission 32, which may include a vehicle drive shaft 56, is drivingly coupled to the drive axles 52 and 54 for transmitting the output torque generated by the internal combustion engine 26 and/or the electric motor generator 28 to the drive axles 52 and 54. The steer axle 50 supports corresponding front wheels 66 and the drive axles 52 and 54 support corresponding rear wheels 68, each of the wheels having service brake components 70. The service brake components 70 may include wheel speed sensors, electronically controlled pressure valves, and the like, to effect control of the vehicle braking system.

The vehicle 20 may also include conventional operator control inputs, such as a clutch pedal 72 (in some manual systems), an ignition or power switch 74, an accelerator pedal 76, a service brake pedal 78, a parking brake 80 and a steering wheel 82 to effect turning of the front wheels 66 of the vehicle 20. The vehicle 20 may further include a cab mounted operator interface, such as a control console 84, which may include any of a number of output devices 88, such as lights, graphical displays, speakers, gages, and the like, and various input devices 90, such as toggle switches, push button switches, potentiometers, or the like. As will be described in more detail below, the output devices 88 include a hybrid information display device 92 that conveys information regarding the hybrid powertrain 22, including fuel efficiency, mode of operation, etc.

To provide power to the control console 84, a DC/DC converter 96 is connected to the high voltage bus 40. The DC/DC converter 96 reduces the voltage it receives, and outputs power at this lower voltage to the control console. The DC/DC converter 96 can output power to other low voltage electrical devices on the vehicle 20. The DC/DC converter 96 may also condition the power prior to directing it to the low voltage electrical devices.

To control the various aspects of the hybrid powertrain 22, a powertrain controller 100 is provided. As shown in FIG. 3, the powertrain controller 100 can be a dedicated controller for the hybrid powertrain 22 or can be incorporated in another general vehicle controller, such as a vehicle system controller (VSC). Although the powertrain controller 100 is shown as a single controller, it may include multiple controllers or may include multiple software components or modules embedded in a single controller. For example, the powertrain controller 100 could be a separate hardware device, or may include a separate powertrain control module (PCM), which could be software embedded within general purpose controller, such as a VSC.

In one embodiment, the powertrain controller 100 may control the operation of one or more of the following devices: the internal combustion engine 26; the electric motor generator 28; the power transfer unit 30; the transmission 32, including the PTO device 34; the electrical storage device 38, optional clutch assemblies 42, etc. In one embodiment, the powertrain controller 100 may include a programmable digital computer and suitable input/output circuitry or the like that is configured to receive various input signals, including without limitation, the operating speeds of the internal combustion engine 26 via sensor 102 and the electric motor generator 28 via sensor 104, transmission input speed via sensor 106, selected transmission ratio, transmission output speed via sensor 108 and vehicle speed via wheel speed sensors (not shown), throttle position via sensor 110, and state of charge (SOC) of the energy storage device 38. The powertrain controller 100 processes these signals and others accordingly to logic rules to control the operation of the hybrid powertrain 22. For example, to start or restart the internal combustion engine 26, the powertrain controller 100 may be programmed to signal delivery of fuel to the internal combustion engine 26 and to signal the operation of the electric motor generator 28 or optional starter to start the engine. It will be appreciated that the powertrain 100 may receive these input signals directly from the associated sensor(s), devices, etc., or may receive the input signals from other vehicle subsystems, as will be described in more detail below.

To support this control, various devices (e.g., the internal combustion engine 26, the electric motor generator 28, etc.) controlled by the powertrain controller 100 may include their own controllers, which communicate with the powertrain controller 100 through a vehicle-wide network, also referred to as a controller area network (CAN) 112, as shown in FIG. 3. Those skilled in the art and others will recognize that the CAN 112 may be implemented using any number of different communication protocols such as, but not limited to, Society of Automotive Engineer's ("SAE") J1587, SAE J1922, SAE J1939, SAE J1708, and combinations thereof. Alternatively, the aforementioned controllers may be software control modules contained within the powertrain controller 100 or other general purpose controllers residing on the vehicle. It will be appreciated, however, that the present invention is not limited to any particular type or configuration of powertrain controller 100, or to any specific control logic for governing operation of hybrid powertrain system 20.

For example, an engine controller 114 may communicate with the powertrain controller 100 and may function to monitor and control various aspects of the operation of the internal combustion engine 26, including ignition timing (on some vehicles), fuel delivery, variable valve timing (if equipped) and the like. To that end, the engine controller 114 typically receives signals from a variety of sensors, including but not limited to the wheel speed sensors (not shown) of the brake components 70, the engine speed sensor 102, the accelerator pedal position sensor 108, etc., either directly or by other system or device controllers (i.e., transmission controller 116, power transfer unit controller 118, the powertrain controller 100, etc.), processes such signals and others, and transmits a variety of control signals to devices including but not limited to fuel control devices 120 for selectively supplying fuel to the internal combustion engine 26, an engine retarder 122, such as a jake brake, etc. The engine controller 114 may also calculate fuel efficiency data, such as miles per gallon, from the engine operating data and/or other vehicle operation data, such as transmission output speed, etc, according to calculating methods known in the art.

As will be described in more detail below, the engine controller 114 may transmit signals indicative of vehicle operational data (e.g., engine speed, throttle position, fuel efficiency data, vehicle speed, etc.) to the powertrain controller 100 or other system controllers via the CAN 112 and may receive control signals from the powertrain controller 100 or from controllers of other vehicle subsystems either directly or via CAN 112 to effect the operation of the internal combustion engine 26.

Similarly, the electric motor generator 28 may include one or more controllers 124 that sends and receives signals to and from the powertrain controller 100 and the electric motor generator 28 for controlling the direction of power flow to/from the electric motor generator 28. The energy storage device 38 may have a controller 126 that may communicate with the powertrain controller 100 and may function to monitor and control various aspects of the operation of the energy storage device 38. To that end, the controller 126 sends and receives signals to and from the powertrain controller 100 and the energy storage device 38. The vehicle may include other controllers such as a PTO controller 128, a braking system controller (not shown), etc., communicatively connected to the CAN 112.

As used herein, controllers, control units, control modules, program modules, etc., can contain logic for carrying out general or specific operational features of the vehicle 20. The logic can be implemented in hardware components, such as analog circuitry, digital circuitry, processing units, or combinations thereof, or software components having instructions which can be processed by the processing units, etc. Therefore, as used herein, the term "controlling component" can be used to generally describe these aforementioned components, and can be either hardware or software, or combinations thereof, that implement logic for carrying out various aspects of the present invention.

Figure 1:
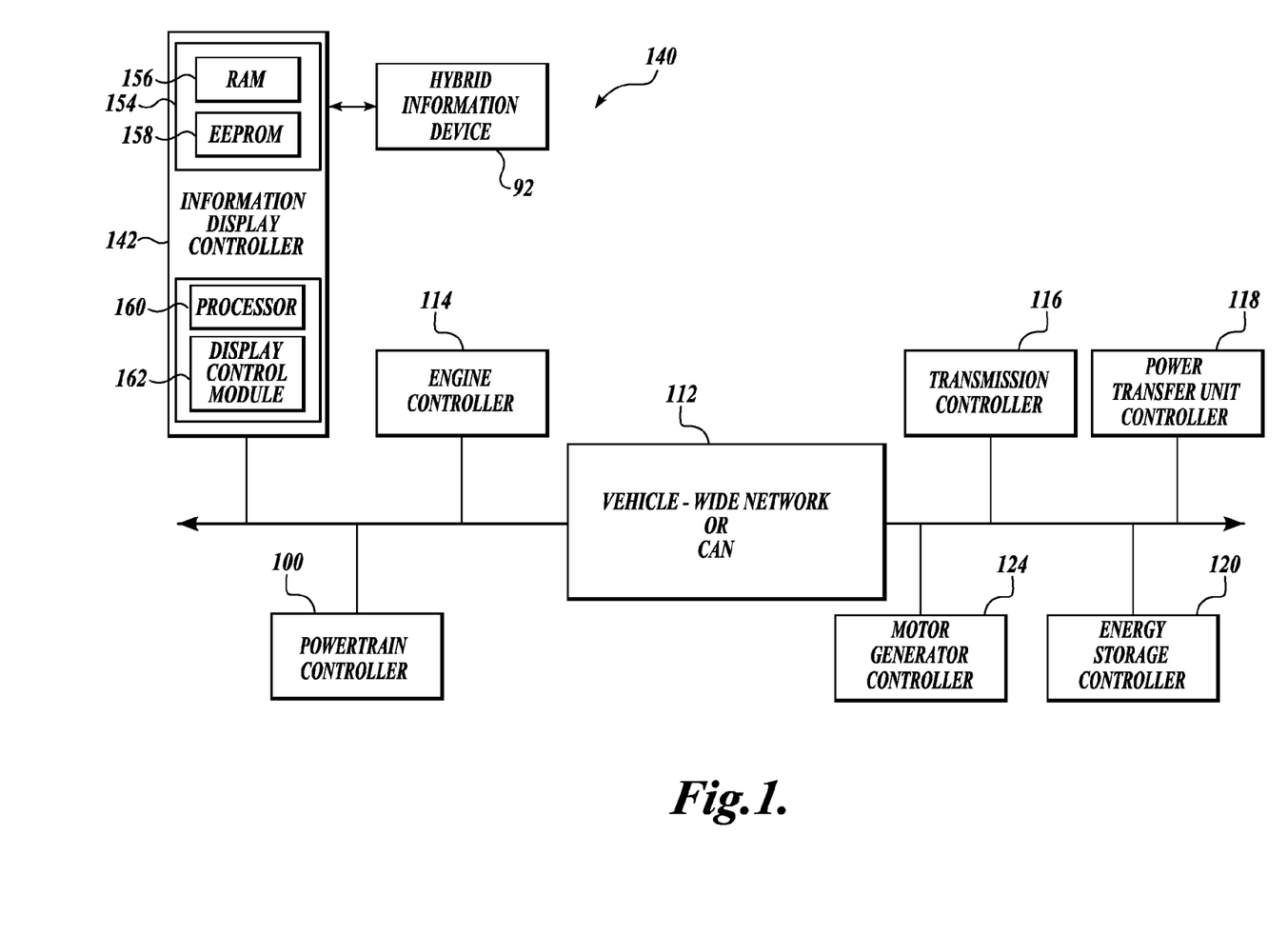
FIG. 1 is a functional block diagrammatic view of one embodiment of an information display system formed in accordance with aspects of the present invention.

Referring now to FIGS. 1 and 2, in one embodiment of the present invention, the powertrain controller 100, either alone or in conjunction with other controllers can control the operation of the vehicle 20 in the following manner. It will be appreciated that the vehicle can be controlled to operate in any number of ways or modes. Additionally, it should be appreciated that the following description of the operation of the vehicle in accordance to one embodiment relates to a parallel hybrid vehicle, and that the operation of vehicles with series hybrid powertrains, combined hybrid powertrains, or power assist hybrids may be slightly different, but within the skill of those skilled in the art.

When it is desired to start the hybrid vehicle 20 from rest (i.e., parked), the ignition switch 74 is moved to the start position. Next, the vehicle operator chooses the appropriate gear, releases the parking brake 80, if set, lifts their foot off of the service brake pedal 78, and applies pressure on the accelerator pedal 76. At this time, the powertrain controller 100 monitors various hybrid powertrain operating parameters, for example, the SOC of the energy storage device 38 and the load state of the vehicle 20, and depending on the SOC of the energy storage device 38 and the load state of the vehicle (typically calculated by accelerator pedal position and/or vehicle speed), the powertrain controller 100 controls the operation of the electric motor generator 28 only ("electric launch mode"), the internal combustion engine only, or combines the output of both via the power transfer unit 30 ("blended torque mode") to provide motive force to the vehicle 20.

For example, if the powertrain controller 100 determines that the SOC of the energy storage device 38 is at a sufficient level with respect to the vehicle load state, the powertrain controller 100 operates the powertrain 22 in the electric launch mode. For example, in a low load state and/or a low vehicle speed, and a high SOC, the powertrain controller 100 operates solely in the electric launch mode. In the electric launch mode, the internal combustion engine is off (engine-off condition), and the powertrain controller 100 signals delivery of electrical energy from the electrical energy storage device 38 to power the electric motor generator 28. Upon receipt of electrical power from the energy storage device 38, the electric motor generator 28 acts as a motor to generate output torque for propelling the vehicle 20.

On the other hand, if the powertrain controller 100 determines that the SOC of the energy storage device 38 is low with respect to the calculated vehicle load state, the powertrain controller 100 operates the powertrain 22 either in the hybrid assist mode, also known as the "blended torque" mode, or the engine only mode. In the blended torque mode, the power controller 100 signals delivery of electrical energy from the electrical energy storage device 38 to power the electric motor generator 28 and fuel delivery to the internal combustion engine 26 so as to be started by the electric motor generator 28, and then signals the internal combustion engine 26 and the energy storage device/electric motor generator to generate output torque, which is "blended" or combined by the power transfer unit 30 according to control signals from the powertrain controller 100. For example, in a medium load state where the powertrain controller 100 determines that improved fuel efficiency may be realized by operating in the blended torque mode, or if additional torque in needed from the electric motor generator 28 during, for example, rapid acceleration situations, the internal combustion engine 26, along with the electric motor generator 28 is operated by the powertrain controller 100 so that the generated output torque is combined by the power transfer unit 30 and sent to the drive axles 52 and 54 through the transmission 32.

It should also be appreciated that the vehicle 20 may start out in electric launch mode, but based on continuously monitored operating conditions of the powertrain, e.g., SOC and vehicle load, the powertrain controller 100 may determine that the internal combustion engine 26 is needed to meet the output demands of the vehicle 20. In this case, the powertrain controller 100 signals for the internal combustion engine 26 to be started by the electric motor generator 28 or a separate starter motor, and signals the appropriate components, e.g., power transfer unit 30, clutch assemblies 44, etc. to combine the output torque of the internal combustion engine 26 and the electric motor generator 28 for propelling the vehicle 20.

When the hybrid vehicle 20 is cruising (i.e. not accelerating), and the internal combustion engine 26 can meet the vehicle load demand, the powertrain controller 100 controls the operation of the internal combustion engine 26, the electric motor generator 28, and the power transfer unit 30 based on the SOC of the energy storage device 38. If the energy storage device SOC is low, the powertrain controller 100 operates the power transfer unit 30 to split the power from the internal combustion engine 26 between the drive axles 52, 54 and the electric motor generator 28 so that the electric motor generator 28 acts as a generator and charges the energy storage device 38. This is called the "utility regeneration" mode. If the SOC of the energy storage device 38 is high, the powertrain controller 100 may operate the internal combustion engine 26 solely to propel the vehicle, or may operate the power transfer unit 32 and the electric motor generator 28 in the blended torque mode, as described above.

At any time the powertrain controller 100 determines during vehicle operation that the SOC of the energy storage device 38 becomes equal to or lower than a threshold level, the internal combustion engine 26 is immediately driven, and the output torque of the internal combustion engine 26 is transmitted to the electric motor generator 28 through the power transfer device 30. In this case, the electric motor generator 28 is operated as a power generator to charge the energy storage device 38. This may occur during vehicle movement or idling situations as well.

The energy storage device 38 may also be charged during vehicle movement via regenerative braking in the regeneration mode. That is, instead of using the brakes to slow or stop the vehicle 20, the electric motor generator 28 is used to slow the vehicle 20. At the same time, the energy from the rotating rear wheels 68 is transferred to the electric motor generator 28 via the transmission 32 and power transfer unit 30 (the internal combustion engine 26 is either in the engine-off mode or is decoupled from the power transfer unit 30 by the clutch assembly 44), which in turn, causes the electric motor generator 28 to act as a generator to charge the energy storage device 38.

Referring now to FIG. 1, there is shown a block diagrammatic view of one embodiment of an information display system, generally designated 140, formed in accordance with aspects of the present invention. The information display system 140 is suitable for use in a vehicle, such as the hybrid vehicle 20 described above, for displaying vehicle operation data, such as hybrid powertrain data. The information display system 140 includes a display controller 142 connected in electrical communication with the hybrid information display device 92. The information display system 140 may include one or more data generators, such as sensors, switches, etc., or may use data generated by data generators of other vehicle systems, such as the hybrid powertrain systems, and accessed via the CAN 112.

As will be described in more detail below, the information display system 140 serves as an interface between the vehicle operator and the systems or components of the vehicle 20, such as the hybrid powertrain 22. In this regard, the information display controller 142 communicates with the powertrain controller 100, the engine controller 114, the transmission controller 116, the power transfer unit controller 118, the electric motor generator controller 124, the energy storage device controller 126, the PTO device controller 128, etc., and provides information to the hybrid information display device 92. Signals output from the various components of the vehicle 20 can be processed, and display calculations can be performed, in the powertrain controller 100, the information display controller 142, or the hybrid information display device 92, or some combination of all three. Although the information display controller 142 is shown in FIG. 1 as a separate controller, it may also be integrated directly into the powertrain controller 100 or other general or device specific controllers.

Turning now to FIG. 1, the components of the information display system 140 will be described in more detail. The hybrid information display device 92 is a display that is capable of displaying to a vehicle operator a variety of information about the vehicle 20 in a graphical, schematic, textual and/or iconic, representation. Such a representation provides the vehicle operator with a much better sense of how each of the various devices in the vehicle interact with one another, and is therefore more relevant than a mere analog or digital gauge that uses a needle or lighted indicators.

As further illustrated in FIG. 1, the information display controller 142 includes a memory 154 with a Random Access Memory ("RAM") 156, and an Electronically Erasable, Programmable, Read-only Memory ("EEPROM") 158, a processor 160, and a hybrid information display module 162. In operation, the hybrid information display module 162 is capable of displaying the powertrain components as icons at varying intensity levels, depending on their current state of operation (e.g., active, non-active). Those skilled in the art and others will recognize that the EEPROM 158 is a nonvolatile memory capable of storing data when a vehicle is not operating. Conversely, the RAM 156 is a volatile form of memory for storing program instructions that are readily accessible by the processor 160. Typically, a fetch and execute cycle in which instructions are sequentially "fetched" from the RAM 156 and executed by the processor 160 is performed. In this regard, the processor 160 is configured to operate in accordance with program instructions that are sequentially fetched from the RAM 156.

Aspects of the present invention may be implemented in the hybrid display module 162. In this regard, the hybrid display module 162 may be loaded from the EEPROM 158 into the RAM 156 at vehicle startup. In one embodiment, the hybrid display module 162 regularly receives hybrid powertrain data, including throttle position information, fuel efficiency data, etc., from communicatively connected devices, such as the powertrain controller 100, the engine controller 114, the transmission controller 118, energy storage controller 124, PTO device controller 126, etc. The hybrid powertrain data is processed into iconic representation of the vehicle 20 and presented on the information display device 92. The throttle position data as well as the fuel efficiency data may also be processed into numeric and/or graphical representation and presented on the information display device 92. The graphical representation may include bar graphs that display the current throttle position data relative to current fuel efficiency. Visual, auditory, and/or haptic feedback may be provided so that the vehicle operator may readily identify whether the current throttle position provides optimal fuel efficiency. As a result, information is available that will allow a vehicle operator to adjust driving habits in order to minimize fuel consumption.

For illustrative purposes, FIGS. 3A-3D depict exemplary graphical display outputs 300, 300', 300", 300''' generated by the information display device 92 for presenting hybrid vehicle operating data to a vehicle operator. FIGS. 3A-3D show several of the many possible display output configurations for the hybrid information display device 92. As shown in FIGS. 3A-3D, an iconic representation 306 of the vehicle 20 includes an engine icon 310 which represents the internal combustion engine 26, a motor icon 312 which represents the electric motor generator 28, an energy storage device icon, such as a battery icon 314, which represents the energy storage device 38, an EPTO icon 316 which represents the PTO device 34, and vehicle steer wheels icon 318 and vehicle drive wheel icon 320 which represents the vehicle steer wheels 66 and drive wheels 68, respectively.

Figure 3A:
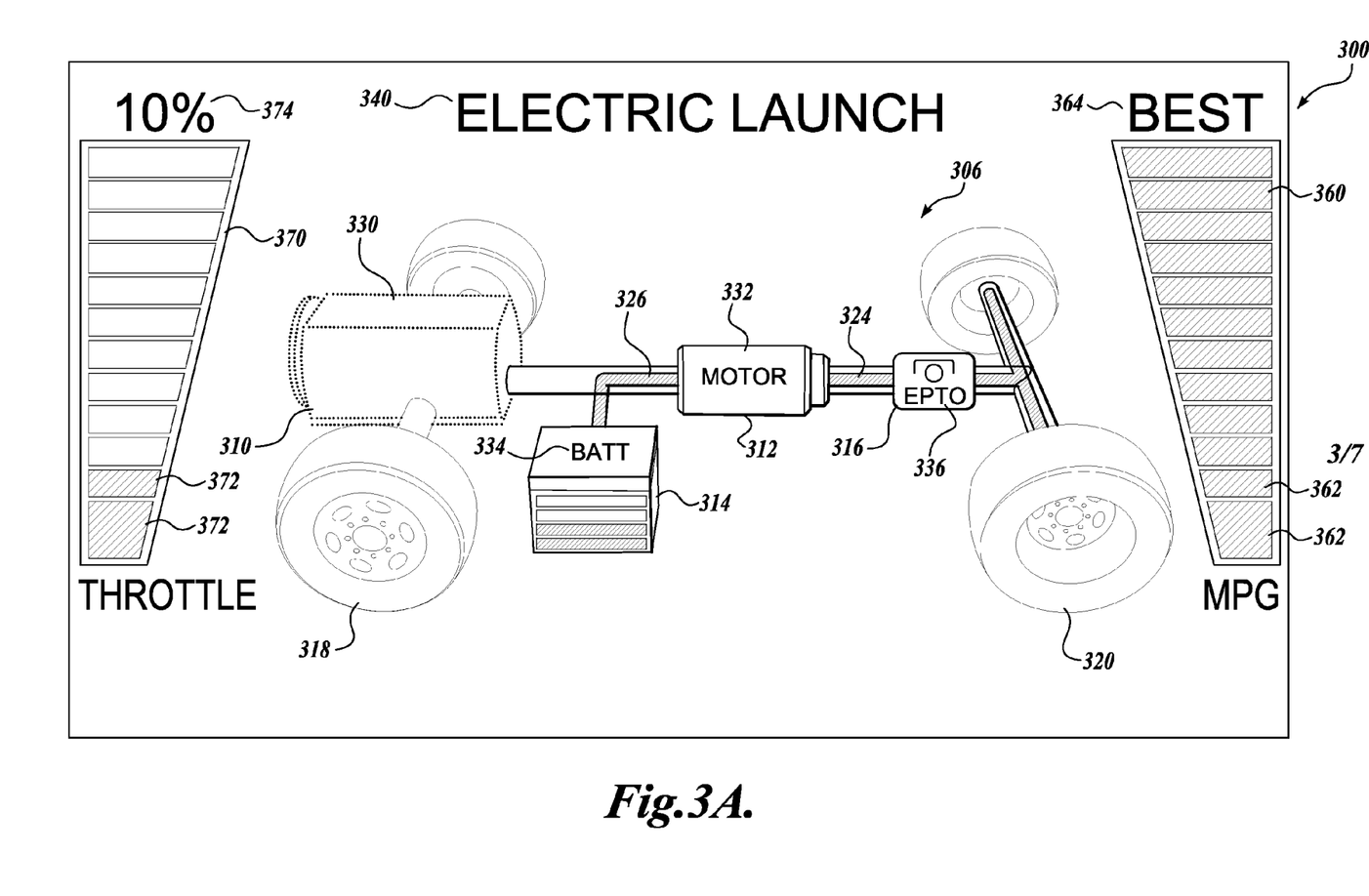
FIGS. 3A-3D are exemplary embodiments of graphical display outputs generated by the information display system of FIG. 1.

One function of the hybrid information display device 92 is to indicate to the vehicle operator which of the various components (e.g., the engine 26, the electric motor generator 28, the PTO device 34, the energy storage device 38, the vehicle drive wheels 68, etc.) of the hybrid powertrain 22 are currently transmitting mechanical or electrical power (i.e., active) and which ones are currently not transmitting mechanical or electrical power (i.e., non-active). For example, FIG. 3A illustrates the electric launch mode, in which the energy storage device 38 supplies power to the electric motor generator 28 to provide output torque to the rear wheels 68. As such, the energy storage device icon 314 and the electric motor generator icon 312 are active, and thus, are highlighted or otherwise displayed with an increased intensity. In some embodiments, the highlighted icons can also be displayed in different colors to provide different information about the vehicle component corresponding to the highlighted icon. In this embodiment, the icons relating to the components that are not active in the electric launch mode (i.e., the internal combustion engine) are displayed in a faded or decreased intensity.

The vehicle information display output 300 also includes a first power flow indicator 324 selectively displayed between the motor icon 312 and the vehicle drive wheels icon 320 to indicate that power is being transferred between the electric motor generator 28 and the vehicle drive wheels 68. As shown in FIG. 3A, the vehicle information display output 300 also includes additional power flow indicators. For example, a second power flow indicator, or energy storage device power flow indicator 326, is selectively displayed between the electric motor generator icon 312 and the battery icon 314 to indicate the power transfer between the electric motor generator 28 and the energy storage device 38. In one embodiment, the power indicators 324 and 326 are also highlighted or displayed with increased intensity to improve the contrast with the other, non-active icons.

In one embodiment, the exemplary display outputs 300, 300', 300", 300''' may further provide the engine icon 310, the electric motor generator icon 312, the battery icon 314 and the PTO device icon 316 with respective textual labels 330, 332, 334, 336 that indicate what each icon represents. In the case of the electric motor generator icon 312, the textual label 332 is "motor," since the electric motor generator 28 operates as a motor in the electric launch mode. In another embodiment, the display outputs 300, 300', 300", 300''' may further include a textual indicator 340, which indicates to the vehicle operator a state of operation of the vehicle 20 that corresponds to the transfer of power between the energy storage device 38, the electric motor generator 28, and the vehicle drive wheels 36. Including such an indicator helps to familiarize the vehicle operator with the various states of operation of the vehicle 20. Thus, the iconic representation 306, combined with the textual indicator 340, provide the vehicle operator with an understanding of the vehicle 20 that text and gauges alone cannot provide.

Figure 3B:
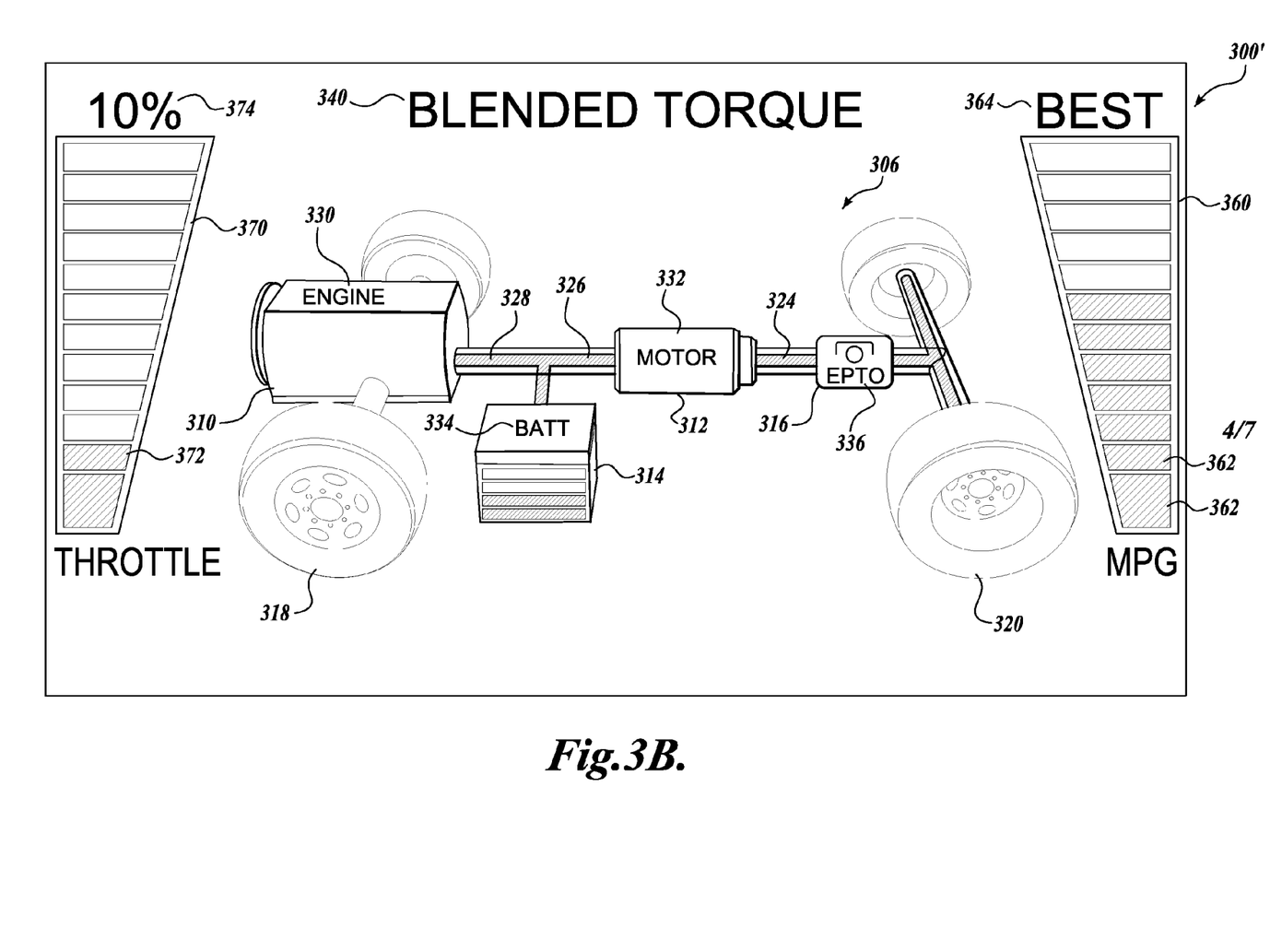

As shown in FIG. 3A, the vehicle 20 is in an electric launch mode in which only the electric motor generator 28 contributes to the vehicle drive wheels 68. FIG. 3B is an exemplary graphical display output 300' depicting a "blended torque" mode, in which both the internal combustion engine 26 and the electric motor generator 28 are contributing torque to the vehicle drive wheels 68. As such, the engine icon 310, the electric motor generator icon 312, and the battery icon 314 are active, and thus, are displayed with an increased intensity. The display output 300' also includes a third power flow indicator 328 selectively displayed between the motor icon 312 and the engine icon 310 to indicate that power is being transferred between the internal combustion engine 26 and the electric motor generator 28. In this embodiment, the first, the second, and the third power flow indicators 324, 326, and 328 are highlighted or otherwise displayed with an increased intensity. Other graphical, iconic, textual etc. representations may be used to depict the directional flow of power between the powertrain components. For example, the power flow indicators may include arrows to point in the direction of power transfer, or the power flow indicators may sequentially blink to convey such information.

Figure 3C:
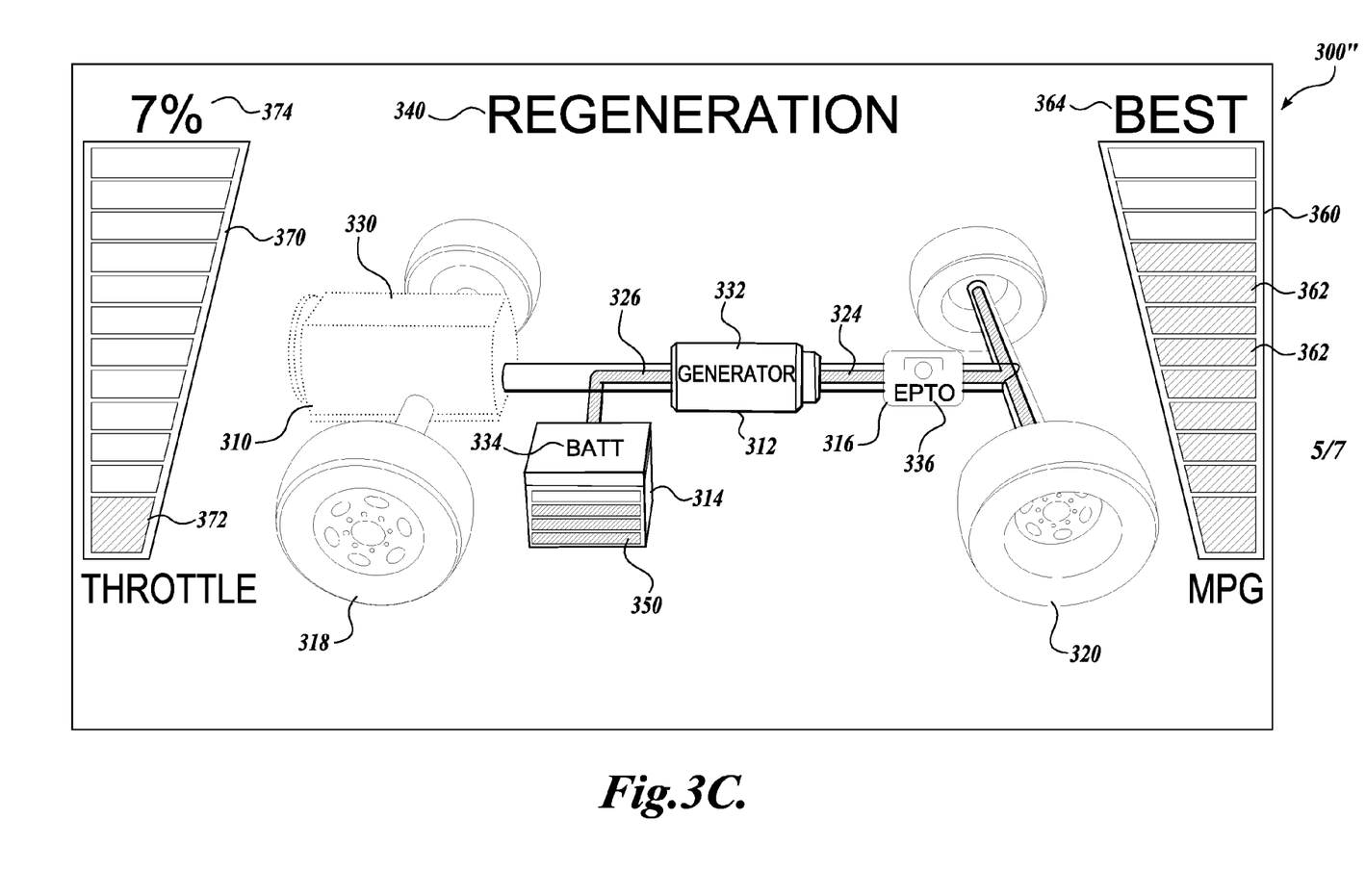

FIG. 3C is an exemplary graphical display output 300" depicting a "regeneration" mode, in which torque is transferred from the vehicle drive wheels 68 to the electric motor generator 28, which in turn charges the energy storage device 38. As such, the electric motor generator icon 312 and the battery icon 314 are active, and thus, are displayed with an increased intensity. On the other hand, the engine 26 is non-active, and thus, the engine icon 310 is displayed with a faded or decreased intensity. The power flow indicators 324 and 326 are also displayed with an increased intensity. The textual indicator 340 indicates a "regeneration" mode.

Figure 3D:
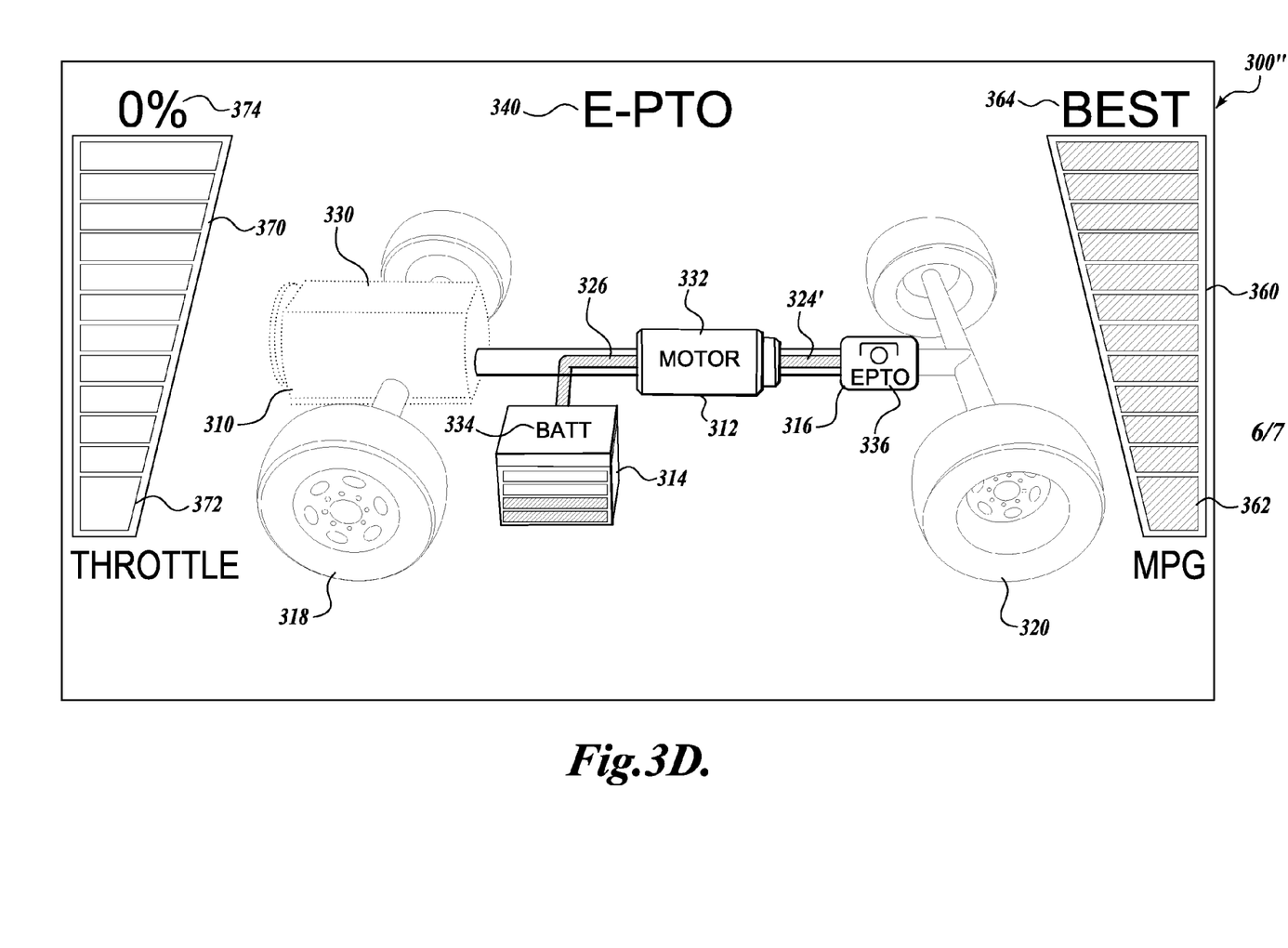

FIG. 3D is an exemplary graphical display output 300''' depicting an "E-PTO" mode in which the electric motor generator 28, from energy supplied by the energy storage device 38, drives the auxiliary output shaft of the PTO device 34 instead of driving the vehicle drive wheels 68. As such, the electric motor generator icon 312, the battery icon 314, and the EPTO icon 316 are displayed with an increased intensity. On the other hand, the engine 26 is non-active, and thus, the engine icon 310 is displayed with a faded or decreased intensity. The display output 300''' includes a modified first power flow indicator 324' selectively displayed between the motor icon 312 and the PTO device icon 316 to indicate that power is being transferred between the electric motor generator 28 and the PTO device 34. The power flow indicators 324' and 326 are also displayed with an increased intensity. The textual indicator 340 indicates an "E-PTO" mode.

As discussed above, the energy storage device 38 used on the vehicle 20 may include a high voltage battery. As shown in FIGS. 3A-3D, the battery icon 314 may include a number of bars 350 that may be illuminated to convey information. For example, as the energy storage device 38 is being charged, the number of bars 350 (See FIG. 3C) that will be illuminated within the battery icon 314 will increase. The illuminated bars indicate the relative state of charge of the energy storage device 38, which gives the vehicle operator additional information regarding the state of the vehicle 20.

Turning now to FIGS. 3A-3D, the exemplary display outputs 300, 300', 300", and 300' may also present the current fuel efficiency (e.g., Miles Per Gallon) relative to the application of the throttle (i.e., accelerator pedal position). In one embodiment, the display output 300 represents the current MPG graphically with a bar graph 360 that contains visual indicators 362 representing the current MPG. As the vehicle accelerates, visual indicators on the bar graph 360 illuminate or change color to represent the change in fuel efficiency. The bar graph 360 graphically depicts ranges of fuel efficiency that are associated with different modes of operation. For example, when the vehicle is operating within the "BEST" range as identified on the bar graph 360 by textual label 364, the vehicle is still in the electric launch mode. Similarly, the display outputs 300, 300', 300", and 300''' may also include a bar graph 370 that contains visual indicators 372 representing the current application of the throttle. In this embodiment, the bar graph 370 is associated with numeric representation 374 that represents the percentage that the throttle is applied. Thus, the bar graphs 360, 370 depict indicators that graphically represent the extent in which application of the throttle will result in a change of fuel efficiency, and in some instances, a change in the mode of operation of the vehicle. While bars are used, other graphical representations may be used to convey such data.

Aspects of the present may provide additional visual, auditory, and/or haptic feedback to convey information regarding whether the current throttle position is in the optimal or preferred range for the current state of operation, or whether the state of operation is about to change, thereby adversely effecting fuel economy. In the example depicted in FIG. 3A, the current throttle position (e.g., 10%) is in the optimal range (e.g., all bars are illuminated on graph 360). By way of example only, to provide additional feedback that the current throttle position is in the optimal range, the bar graph 260 may be presented on the graphical display output 300 in a "normal" color (e.g., green). By presenting the throttle position vs. fuel efficiency in this way, readily understandable information is provided to indicate that the throttle position is in the optimal range to improve fuel efficiency and to remain in the electric launch mode.

Now with reference to FIG. 4, a flow diagram that depicts one exemplary embodiment of a display method 400 formed in accordance with the present invention will be described. Generally stated, an iconic representation of the vehicle powertrain may be presented. In particular, the vehicle powertrain is iconically presented to the operator using a select number of intensities, depending on the operational state of the component. Additionally, in one embodiment, throttle position information may be obtained and displayed relative to fuel efficiency so that a vehicle operator may adjust driving habits to minimize fuel consumption. In this regard, the display method 400 may be implemented by the information display module 144 in the information display controller 142 (FIG. 1). Accordingly, vehicle operational information may be obtained and presented as exemplary graphical display outputs 300, 300', 300", 300'", as described above with reference to FIGS. 3A-3D. It should be appreciated that in embodiments of the present invention, the icons representing the powertrain, the current throttle position, the current fuel efficiency, and the textual labels, may be displayed separately or in any combination, as desired.

Figure 4:
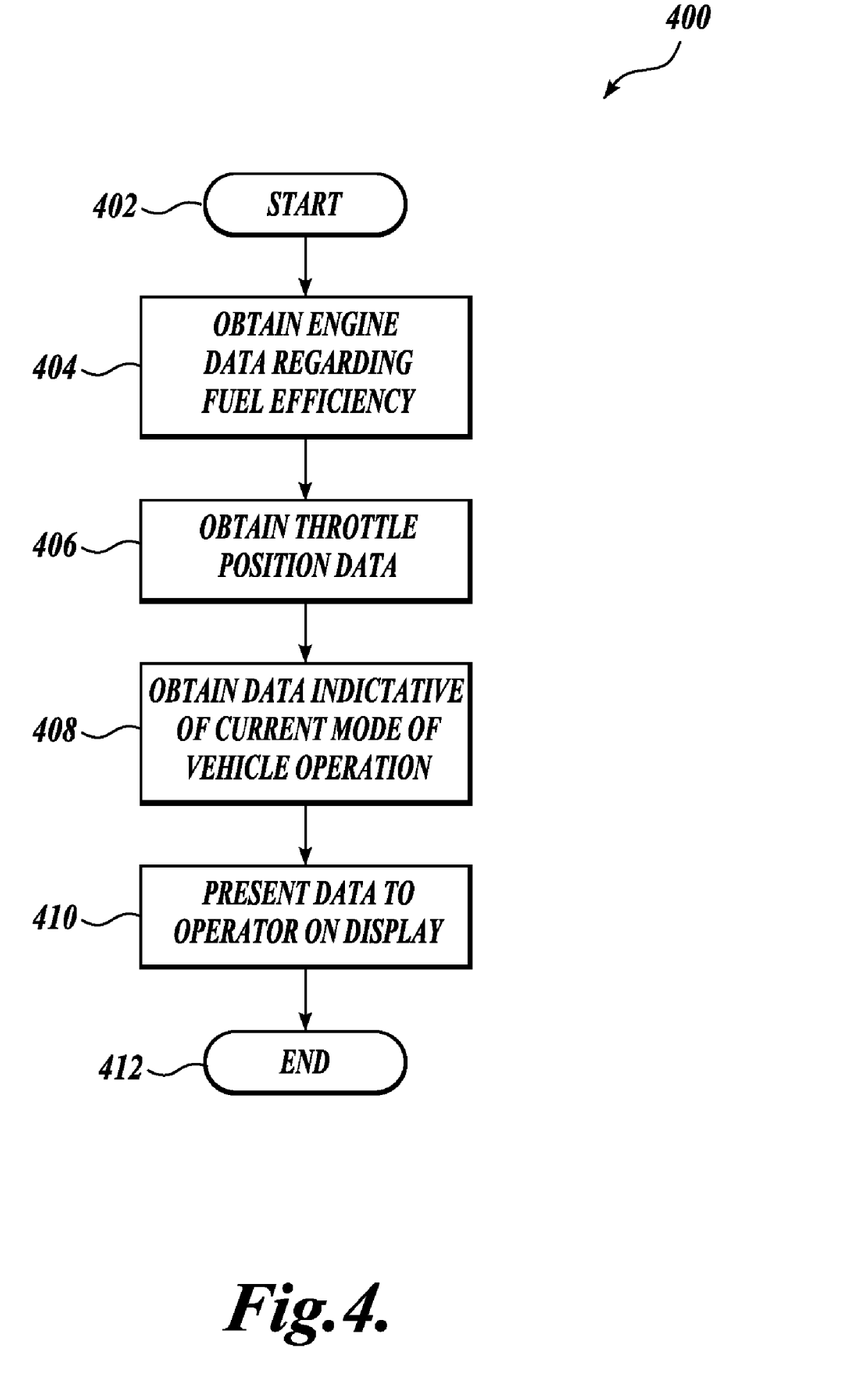
FIG. 4 is an exemplary flow diagram for gathering and presenting vehicle operating data in accordance with an embodiment of the present invention.

As illustrated in FIG. 4, the display method 400 begins at block 402, and at block 404, a set of engine operation data is obtained that identifies the present fuel efficiency of the vehicle 20. Other data may be utilized to calculate fuel efficiency, such as transmission output speed, wheel speed, transmission ratio, etc. This data may be transmitted to the information display controller 142 over the CAN 110 where the data is available to the display method 400.

At block 406, data is received that includes the current position of the throttle as signaled by the accelerator pedal sensor 110. In one embodiment, the throttle position data is periodically transmitted over the CAN 112 to the information display controller 142 where it is available to the display method 500. In this regard, those skilled in the art and others will recognize that the throttle position may be quantified and reported by any number of different vehicle components. By way of example only, the throttle position may be reported from the engine controller 114.

At block 408, data is received that includes the current operating conditions of the powertrain 22, including the current state or mode of operation. In one embodiment, the current state or mode of operation data is periodically transmitted over the CAN 112 to the information display controller 142 where it is available to the display method 400. In this regard, those skilled in the art and others will recognize that this data may be quantified and reported by any number of different vehicle components.

At block 410, the current throttle position, the current fuel efficiency, and/or the vehicle state or mode of operation is presented to a vehicle operator. In one embodiment, the throttle position is presented both numerically and graphically. Throttle position data displayed to a vehicle operator on the graphical display output 300 (FIGS. 3A-3D) may be "refreshed" based on the throttle information obtained, at block 406. However, since refreshing data that is presented on a graphical display may be performed using techniques that are generally known in the art, these techniques will not be described here. Similarly, in one embodiment, current fuel efficiency data is presented textually and/or graphically. Fuel efficiency data displayed to a vehicle operator on the graphical display output 300 (FIGS. 3A-3D) may be "refreshed" based on the throttle information obtained, at block 404.

The state or mode of operation of the vehicle 20 can be presented to the operator in a number of ways. In one embodiment, an iconic representation of the vehicle and power flow indicators are shown as depicted, for example, in FIGS. 3A-3D. In another embodiment, the state or mode of operation can be represented by a textual indicator 340. The state of operation data displayed to a vehicle operator by the graphical display output 300 (FIGS. 3A-3D) may be "refreshed" based on the powertrain data, including mode of operation data, obtained, at block 408.

In displaying the mode of the vehicle 20, the active components are depicted with an increased intensity. On the other hand, non-active components are shown in a decreased intensity. In some embodiments, the vehicle wheel icons 318 and 320 are displayed with a regular intensity in-between the highlighted or increased intensity and the faded or decreased intensity. As a result, the vehicle operator can quickly and easily ascertain the current mode of the vehicle operation. The method 400 proceeds from block 410 to block 412, where the method 400 ends.

The principles, representative embodiments, and modes of operation of the present invention have been described in the foregoing description. However, aspects of the present invention which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present invention. Accordingly, it is expressly intended that all such variations, changes, and equivalents fall within the spirit and scope of the present invention, as claimed.

The embodiments of the invention in which an exclusive property or privilege is claimed are defined as follows:

1. An information display system for a hybrid vehicle, comprising:
    at least one signal producing device generating data;
    a controlling component in communication with the at least one signal producing device to transform the data into one or more display signals;
    a display device disposed in communication with the controlling component for receiving the one or more display signals and displaying the one or more signals as a viewable image, wherein the viewable image includes an energy storage device icon, an engine icon, a motor icon, and one or more vehicle wheel icons;
    wherein at least one of the energy storage device icon, the engine icon, and motor icon is displayed with a lower intensity than the one or more vehicle wheel icons, and wherein at least one of the energy storage device icon, the engine icon, and motor icon is displayed with a higher intensity than the one or more vehicle wheel icons.

2. The information display system of claim 1, wherein the viewable image further includes an electric power take off icon.

3. The information display system of claim 1, wherein the viewable image further includes a textual label for one or more of the icons.

4. The information display system of claim 1, wherein the viewable image further includes a textual indicator presenting a mode of operation of the vehicle.

5. The information display system of claim 1, wherein the viewable image further includes a textual indicator presenting a percentage of a current application of a throttle.

6. The information display system of claim 1, wherein the viewable image further includes a graphical representation of a current fuel economy contemporaneously presented with the energy storage device icon, the engine icon, the motor icon, and the one or more vehicle wheel icons.

7. The information display system of claim 1, wherein the viewable image further includes a graphical representation of a current application of a throttle.

8. The information display system of claim 1, wherein the viewable image further includes a first power flow indicator selectively displayed between the motor icon and the one or more vehicle wheel icons to indicate power being transferred between at least a portion of an electric motor generator and one or more vehicle drive wheels.

9. The information display system of claim 8, wherein the viewable image further includes a second power flow indicator selectively displayed between the motor icon and the energy storage device icon to indicate power being transferred between at least a portion of the electric motor generator and the energy storage device.

* * * * *